US009685772B2

(12) United States Patent
Carreira (10) Patent No.: US 9,685,772 B2
(45) Date of Patent: Jun. 20, 2017

(54) INSULATED POWER LINE FRAMINGS (71) Applicant: K-Line Insulators Limited, Toronto (CA)

(72) Inventor: Tony Carreira, Toronto (CA)

(73) Assignee: K-Line Insulators Limited, Toronto (CA)

( * ) Notice: Subject to any disclaimer, the term of this patent is extended or adjusted under 35 U.S.C. 154(b) by 0 days.

(21) Appl. No.: 15/112,588

(22) PCT Filed: Jan. 8, 2015

(86) PCT No.: PCT/CA2015/050007
§ 371 (c)(1),
(2) Date: Jul. 19, 2016

(87) PCT Pub. No.: WO2015/103702
PCT Pub. Date: Jul. 16, 2015

(65) Prior Publication Data
US 2016/0336727 A1 Nov. 17, 2016

Related U.S. Application Data (60) Provisional application No. 61/924,755, filed on Jan. 8, 2014.

(51) Int. Cl.
*H02G 7/20* (2006.01)
*H02G 7/05* (2006.01)

(52) U.S. Cl.
CPC ............... *H02G 7/20* (2013.01); *H02G 7/05* (2013.01)

(58) Field of Classification Search
CPC .. H02G 7/20; H02G 7/05; H02G 7/12; H02G 7/053; H02G 7/00; H02G 7/02; H02G 7/04; H02G 7/125; H02G 7/14; H02G 7/025
USPC ......... 174/149 R, 137 R, 138 R, 138 G, 142, 174/146, 148, 40 R, 154, 135, 45 R, 169; 248/74.4, 200, 205.1, 74.1, 74.2, 68.1
See application file for complete search history.

(56) References Cited

U.S. PATENT DOCUMENTS

| 1,620,949 | A | | 12/1923 | Cassels | |
|---|---|---|---|---|---|
| 3,603,717 | A | * | 9/1971 | Scott | H02G 7/20 174/45 R |
| 4,615,154 | A | * | 10/1986 | Troutner | E04H 12/04 174/45 R |
| 4,728,749 | A | * | 3/1988 | Knight | H01B 17/16 174/45 R |
| 5,777,262 | A | * | 7/1998 | Nourai | H02G 7/20 174/40 R |
| 5,837,943 | A | | 11/1998 | Kellett | |
| 6,834,469 | B2 | * | 12/2004 | Fingerson | E04H 12/24 52/651.02 |

(Continued)

OTHER PUBLICATIONS

International Search Report and Written Opinion for International Application No. PCT/CA2015/050007, dated Mar. 18, 2015, 9 pages.

*Primary Examiner* — Angel R Estrada
(74) *Attorney, Agent, or Firm* — Westman, Champlin & Koehler, P.A.

(57) ABSTRACT

Insulator integrated framings for power lines and kits for assembling same are disclosed. The framings have retaining member assemblies configured to retain power line wires and conductors, separated from power line support structures and other retaining member assemblies by insulators.

20 Claims, 10 Drawing Sheets (56) References Cited

U.S. PATENT DOCUMENTS 7,007,438 B1\* 3/2006 Shields ............... E04C 3/14
  52/712
7,977,571 B2\* 7/2011 Devine ............... H02G 7/02
  174/40 R \* cited by examiner

INSULATED POWER LINE FRAMINGS

CROSS-REFERENCE TO RELATED APPLICATIONS

The present application claims priority from U.S. provisional patent application No. 61/924,755, filed Jan. 8, 2014, the entirety of which is hereby incorporated by reference.

TECHNICAL FIELD

The present application relates to power line equipment. More particularly, the present application relates to insulated framings for supporting power lines.

BACKGROUND

Power transmission lines carrying electrical power are often suspended above a ground surface using a series of utility poles or other elevated support structures. In order to prevent the utility pole from being energized and grounding or shorting the power lines, insulated framings are used to insulate the energized power lines from the supporting pole or other structure. Common framings used in the power industry include wooden or metal cross-arms or brackets. Power line conductor or cables are mounted to various points on the structures, cross-arms or brackets and separated from direct contact with the structures, cross-arms or brackets by insulators, which are components constructed from non-conductive materials such as fiberglass, polymers, and ceramics.

Common configurations for insulators mounted to framings include vertical insulators extending either upward or downward from the cross-arm or the top of the utility pole, and horizontal insulators extending to the left or right of the support structure, ends of the cross-arm, or brackets. The insulators usually have base fittings that are mounted on the structure, cross-arm or brackets. The end of the insulator distant from the structure, cross-arm or bracket is usually fitted with a clamp or other support device to hold a power line in place: horizontally-mounted insulators use a horizontally-oriented clamp or other support device, while vertically-mounted insulators use a vertically-oriented clamp or other support device.

SUMMARY

Insulated power line framings are provided. In a first aspect, the insulated framing comprises a top retaining member assembly configured to retain a power line wire or conductor, an upper left insulator extending downward and leftward from the top retaining member assembly, an upper right insulator extending downward and rightward from the top retaining member assembly, a base member having a left end attached to a bottom end of the upper left insulator and a right end attached to a bottom end of the upper right insulator, the base member adapted to connect at its midpoint to a power line support structure, a lower left insulator extending leftward from the left end of the base member, a lower right insulator extending rightward from the right end of the base member, a left retaining member assembly configured to retain a power line wire or conductor attached to a left end of the lower left insulator, and a right retaining member assembly configured to retain a power line wire or conductor attached to a right end of the lower right insulator.

In another aspect, the framing further comprises a left mid-leg fitting attached to the left end of the base member, and a right mid-leg fitting attached to the right end of the base member, wherein the upper insulators and lower insulators attach to the base member by means of the mid-leg fittings.

In a further aspect, one or more of the upper insulators and lower insulators are detachably connected to one or more of the retaining member assemblies and mid-leg fittings.

In a further aspect, the detachable connection is by means of a post protruding from an end of the insulator adapted for insertion into a cavity in the retaining member assembly or mid-leg fitting.

In a further aspect, the lower left insulator and lower right insulator also extend downward.

In a further aspect, each insulator comprises a rigid elongated core with a non-conductive coating material such as but not restricted to glass, porcelain or a polymer sheath and sheds also known as housing.

In a further aspect, the base member comprises two arms extending upward and to the sides from the midpoint of the base member.

In a further aspect, the base member comprises two arms extending substantially straight out to the sides from the midpoint of the base member.

In a further aspect, the base member further comprises a bracket at the midpoint of the base member adapted for attachment to the power line support structure.

In a further aspect, the bracket is adapted for attachment to the power line support structure by means of bolt holes positioned to align with conventionally spaced bolt holes used to support existing power line framings.

In a further aspect, the framing comprises a top retaining member assembly configured to retain a power line wire or conductor, an upper left insulator extending leftward from the top retaining member assembly, an upper right insulator extending rightward from the top retaining member assembly, a base member having a left end attached to a bottom end of the upper left insulator and a right end attached to a bottom end of the upper right insulator, the base member adapted to connect at its midpoint to a power line support structure, a lower left insulator extending downward and leftward from the left end of the base member, a lower right insulator extending downward and rightward from the right end of the base member, a left retaining member assembly configured to retain a power line wire or conductor attached to a bottom end of the lower left insulator, and a right retaining member assembly configured to retain a power line wire or conductor attached to a bottom end of the lower right insulator.

In a further aspect, the framing further comprises a left mid-leg fitting attached to the left end of the base member and a right mid-leg fitting attached to the right end of the base member, wherein the upper insulators and lower insulators attach to the base member by means of the mid-leg fittings.

In a further aspect, one or more of the upper insulators and lower insulators are detachably connected to one or more of the retaining member assemblies and mid-leg fittings.

In a further aspect, the detachable connection is by means of a post protruding from an end of the insulator adapted for insertion into a cavity in the retaining member assembly or mid-leg fitting.

In a further aspect, the lower left insulator and lower right insulator also extend leftward and rightward respectively.

In a further aspect, each insulator comprises a rigid elongate core with a non-conductive coating material such as but not restricted to glass, porcelain or a polymer sheath and sheds also known as housing.

In a further aspect, the base member comprises two arms extending upward and to the sides from the midpoint of the base member.

In a further aspect, the framing comprises a central retaining member assembly configured to retain a power line, an inner left insulator extending leftward from the central retaining member assembly, a left mounting assembly attached to a left end of the inner left insulator, the left mounting assembly adapted to connect to a power line support structure, an outer left insulator extending leftward from the left mounting assembly, a left retaining member assembly configured to retain a power line attached to a left end of the outer left insulator, an inner right insulator extending rightward from the central retaining member assembly, a right mounting assembly attached to a right end of the inner right insulator, the right mounting assembly adapted to connect to a power line support structure, an outer right insulator extending rightward from the right mounting assembly, and a right retaining member assembly configured to retain a power line attached to a right end of the lower right insulator, wherein the width of the central retaining member assembly is shorter than the width of each of the inner insulators.

In a further aspect, one or more of the inner insulators and outer insulators are detachably or not connected to one or more of the retaining member assemblies and mounting assemblies.

In a further aspect, the application is directed to a kit comprising a plurality of insulators and a plurality of retaining member assemblies for use in constructing the insulated power line framings.

Further aspects will be apparent to a skilled person based on the description and claims.

BRIEF DESCRIPTION OF THE DRAWINGS

The present application in its aspects of insulator power line framings will now be described in greater detail with reference to the accompanying drawings of example embodiments in which.

The drawings are intended only to be illustrative of example embodiments, and a skilled person would understand that other embodiments not shown would come within the scope of the claims and the written description.

DESCRIPTION OF EXAMPLE EMBODIMENTS

Examples embodiments relate to insulated power line framings. The framings incorporate insulated components into their support structures.

In a first example embodiment, a framing comprises a roughly triangular structure with a vertex pointing upward. The triangular framing is adapted for mounting to a utility pole or other support structure at some point, possibly the midpoint of its base. The legs of the triangular framing incorporate insulators to separate the bottom two vertices from the top vertex, where a top clamp is mounted for retaining a power line. The legs also extend downward beyond the bottom vertices, projecting insulators to the sides and/or downward to separate two side clamps from the bottom vertices.

Figure 1:
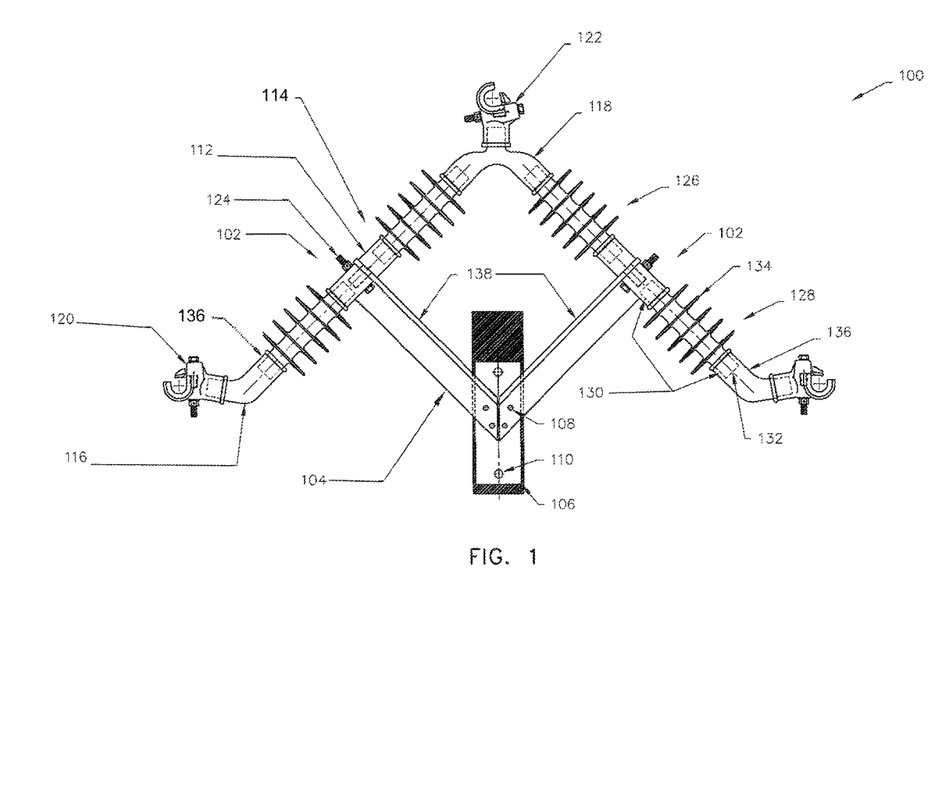
FIG. 1 is a front view of a triangular insulated framing according to a first example embodiment, with dashed lines indicating hidden components.

With reference to the drawings, FIG. 1 shows a front view of a triangular framing 100 according to a first example embodiment. In the illustrated embodiment, the triangular framing 100 comprises two legs 102 and a base member 104, with the legs 102 meeting the base member 104 at the two lower vertices 114 of the triangular structure. The base member 104 is connected at its midpoint or other location to a bracket 106 by means of screws 108 or other connectors. The bracket 106 is adapted to be mounted to a utility pole or other structure by means of bolts 110 or other connectors. In some embodiments, the holes used for the bolts 110 may be spaced and sized in accordance with legacy systems used on utility poles or other support structures, allowing an old cross-arm or other framing device to be removed and the triangular framing 100 installed without drilling new holes into the utility pole.

The illustrated embodiment uses a base member 104 having a substantially V-shaped form with two arms 138 extending diagonally upward and outward from the bracket 106. However, other embodiments could use a straight horizontal bar or another shape for the base member 104 as long as the alternative form allows attachment to the bracket and attachment to the two legs 102. In some embodiments, the base member 104 and bracket 106 could be integrated into a single unit.

Each leg 102 of the triangular framing 100 has a mid-leg fitting 112 adapted to attach to an end of the base member 104. In the illustrated embodiment, each mid-leg fitting 112 can be attached to the base member 104 by means of a bolt 124 or other connector. The mid-leg fitting 112 can accommodate two insulators, one attached at either end of the fitting 112. An upper insulator 126 is fitted above the mid-leg fitting 112, while a lower insulator 128 is fitted below the mid-leg fitting 112. Each insulator 126, 128 attaches to a corresponding end of the mid-leg fitting 112. In some embodiments, this attachment is by means of a post 132 protruding from an end of the insulator, which is fitted into a cavity 130.

In the illustrated embodiment, the insulators 126, 128 are substantially rod-shaped. Each insulator 126, 128 has a plurality of sheds 134 extending radially outward along its body, intended to interrupt the flow of water along the body of the insulator.

A top adapter 118 is situated at the top vertex of the triangular structure. In some embodiments, the top adapter 118 has two cavities 130 for accommodating posts 132 at the top ends of the upper insulators 126. The top adapter 118 has a substantially upside-down Y-shaped form but could have another shape. In some embodiments, the upper protrusion forms a post or other mounting structure configured to mount a clamp.

The upper insulators 126 in the illustrated embodiment extend diagonally upward and inward from the mid-leg fitting 112 to the top adapter 118. In other embodiments, they could extend substantially horizontally, with the top adapter 118 situated at approximately the same height as the mid-leg fitting 112.

The lower insulators 128 in the illustrated embodiment extend diagonally downward and outward from the mid-leg fitting 112. In other embodiments, they could extend horizontally outward or vertically downward.

The insulators 126, 128 used in the illustrated embodiment are formed from a core of a non-conducting rigid material, such as a fiber glass rod or other material. The rigid core is surrounded by a coating of a non-conducting material such as ceramic, glass, or a polymer such as silicone. The sheds 134 may be formed from the same material as the coating or other material. Embodiments using posts 132 extending from the ends of the insulator 126, 128 may form the posts 132 as a bare extension of the core or may cover them with the coating.

The top adapter 118 is fitted with a top clamp 122. In some embodiments, the top clamp 122 is integrally formed with the top adapter 118. In other embodiments, the top clamp is mounted by means of a cavity 130 adapted to mount the clamp 122 on the post 132 of the top adapter 118. Similarly, two bottom clamps 120 are fitted to the bottom adapters 116 by similar means (i.e., integrally or by a connecting means). Some embodiments may vary the means by which these clamps are fitted to the adapters.

The clamps 120, 122 are each configured to retain a power line, and may be of any of the designs commonly used in the industry, including horizontal clamps or vertical clamps. In some applications, each of the power lines may represent one phase of a three-phase power supply. The clamps may in some embodiments be mounted on trunnions which are in turn mounted on the adapters or are integrally formed therewith. In some embodiments, retaining members may be used to hold the power lines in place other than clamps, such as tie tops or other devices.

In some embodiments, the clamps used may be substantially similar to those described in U.S. Pat. No. 5,837,943 issued Nov. 17, 1998 to Kellett, entitled "Electrical power line insulator with universal end clamp". These clamps, called K-Clamps™ and also known as Universal Clamp-tops™, are adapted to either vertical or horizontal mounting and may present advantages of safety and ease of use when being used to secure or remove a power line within the clamp. In such embodiments, the top adapter 118 and bottom adapters 116 may comprise adapters commonly used in conjunction with K-Clamps™, e.g. a K-Frame™ adapter and two K-Adapters™ respectively. The adapters 116, 118 may also be integrally formed with the K-Clamp™. The K-Clamps™ act as combined trunnion/clamps.

Collectively, a clamp and its adapter form a retaining member assembly 136. In some embodiments, the clamps or other retaining members may be integrated into a single unit with the adapters to form a unitary retaining member assembly.

In some embodiments, the base member 104, the mid-leg fittings 112, the top adapter 118, the bottom adapters 116, and the clamps 122, 120 are formed from metal, such as aluminum or steel. In other embodiments, one or more of these components may be formed from another material, including non-conductive materials such as fiber glass or plastic.

The triangular framing 100 could in some embodiments present advantages over other framing designs. For example, relative to a framing with insulators suspended downward from a horizontal cross-arm and conductors connected to the bottoms thereof, the triangular framing 100 may in some embodiments place the conductors relatively high, allowing more sag on the line and thereby increasing line capacity. The example embodiment shown is a roughly bilateral triangle. Other embodiments may be other triangle types, such as equilateral triangles to maximize the distance between the vertices.

Furthermore, using insulators detachably connectible to the fittings of the adapters, and using clamps detachably connectible to the adapters, may present advantages in certain embodiments. The modularity of such a construction may allow individual damaged or undesirable components to be swapped out for new components without replacing the entire structure. It may also ease the transportation and handling of the framings, which can be assembled as needed. It may also allow customization of framing configuration, for example by using different insulator sizes or types for different applications, or by using different adapters or clamps. Thus, the height and/or length of an insulator could be chosen by the voltage class of the application, and the length of the insulators, adapters, fittings, and other components could be chosen based on the desired conductor spacing for a given voltage class.

A modular configuration may allow a user to use the same insulators and other components with multiple different framing models, such as one of the triangular framings and one of the straight horizontal framings described in further detail below. In some circumstances this would provide the advantage of reducing the number of parts needed in a supply chain and inventory while also providing flexibility in using different components for specific applications.

However, some embodiments may use a unitary construction for two or more of the parts that are shown as modular in the illustrated embodiments. This may be done for ease of assembly or manufacture, for improved structural integrity, or for other reasons.

Figure 2:
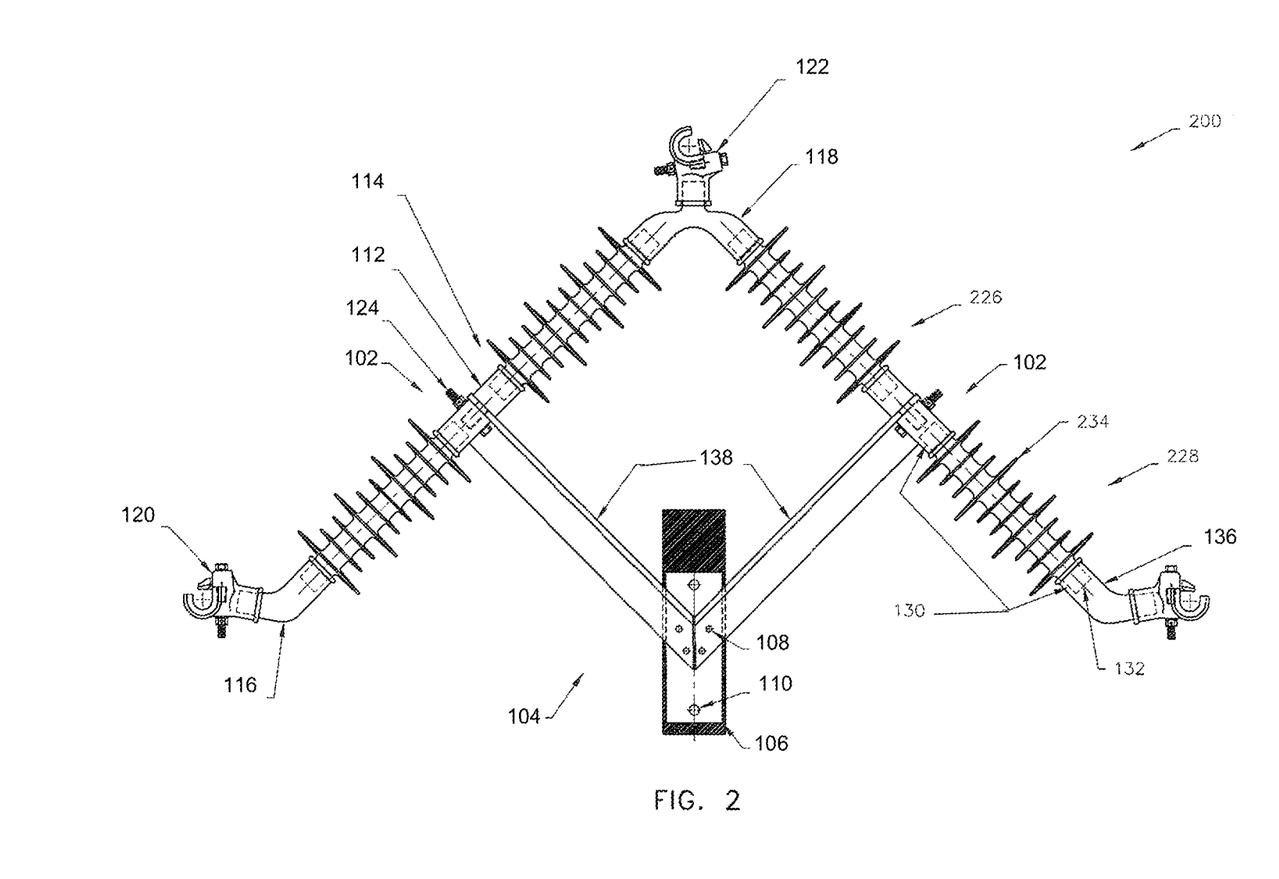
FIG. 2 is a front view of a triangular insulated framing according to a second example embodiment, with dashed lines indicating hidden components.

FIG. 2 shows a front view of an alternative embodiment in the form of a triangular framing 200 having upper and lower insulators 226, 228 with alternating sheds 234. The alternating shed pattern varies the width of the sheds 234 ringing the insulators 226, 228, thereby potentially using less material with similar effectiveness, potentially yielding thereby a lighter and less expensive insulator in some configurations. The dimensions of the various components may also differ from those of the illustrated embodiment of FIG. 1. Otherwise the structure and operation of the triangular framing 200 in FIG. 2 is similar to the triangular framing 100 in FIG. 1.

Figure 3:
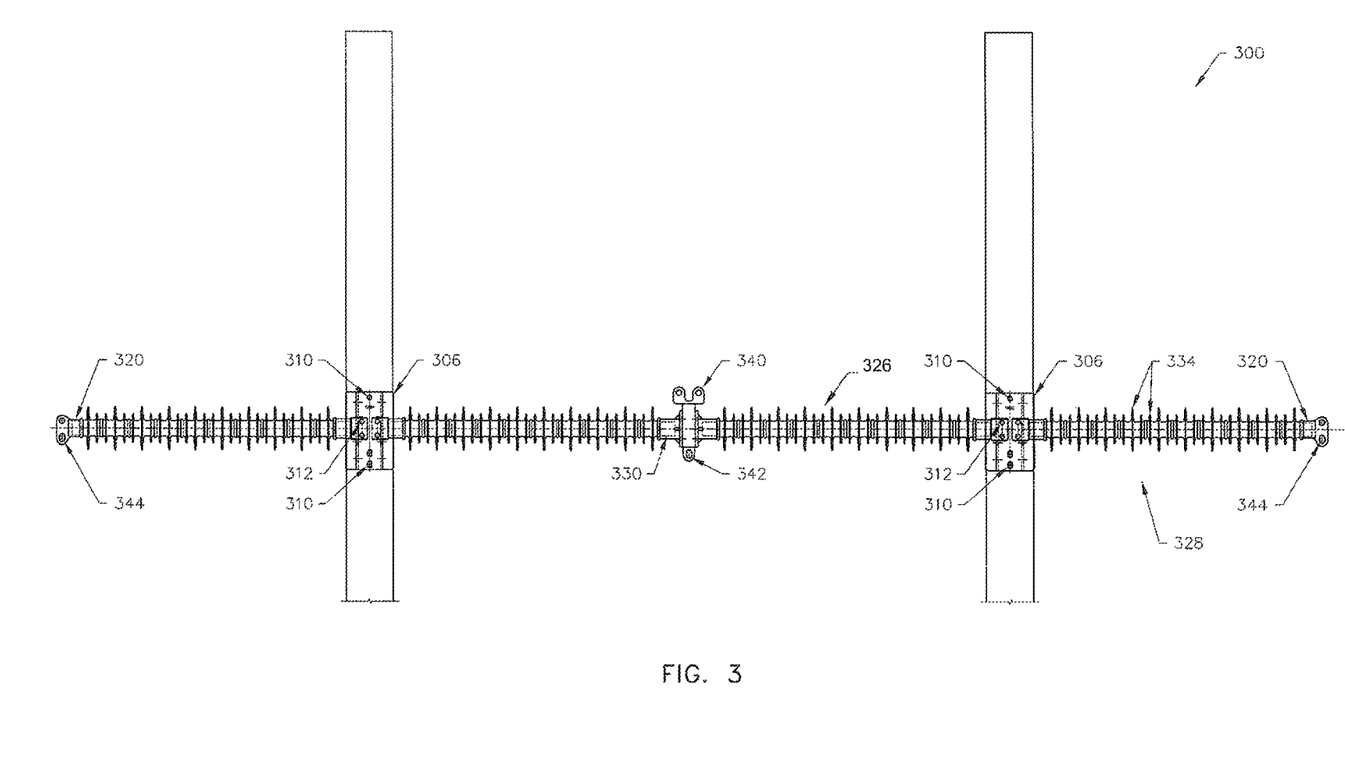
FIG. 3 is a front view of a straight horizontal insulated framing according to a third example embodiment, with dashed lines indicating hidden components.

FIG. 3 shows a front view of a third example embodiment in the form of a straight horizontal framing 300. The framing 300 is configured to be mounted on two parallel utility poles or other support structures by means of two mounting assemblies such as brackets 306, using bolts 310 or other fastening means. It is intended to support three conductors at approximately the same horizontal level: one between the two poles, and one on the outside of each of the poles.

To that end, the framing 300 in the illustrated embodiment comprises two outer insulators 328 and two inner insulators 326 arranged in a roughly linear, end-to-end configuration. However, the insulators in the framing arrangement may also be positioned in an upward or downward angle to the vertical.

Each outer insulator 328 extends horizontally outward from the outside of each bracket 306 or at an angle upward or downward from the vertical and is mounted to the bracket 306 by a bracket fitting 312 or by some other connecting means. At the outer end of each outer insulator 328 is mounted a retaining member assembly 320 adapted to support an insulator via an insulator support 344 or to mount another retaining member, such as a clamp.

Each inner insulator 326 extends horizontally inward from the inside of each bracket 306 or at an angle upward or downward from the vertical and is mounted to the bracket 306 by a bracket fitting 312 or by some other connecting means. At the meeting point of the inner insulators 326 at the midpoint of the linear structure, a central retaining member assembly 340 is mounted to the inner ends of the two inner insulators 326. The central retaining member assembly 340 is adapted to support an insulator via an insulator support 342 or to mount another retaining member, such as a clamp.

The insulators 326, 328 may be similar to the insulators of the previously-described embodiments, having sheds 334 or uniform or varying width and comprising a rigid core and an insulated outer coating.

The various fittings 320, 312, 340 may be mounted to the insulators 326, 328 similarly to the previously described embodiments, e.g. by means of a cavity 330 adapted to receive the end of an insulator.

In embodiments using a post and cavity-style connector for the insulators, adapters, fittings, K-Clamps™, horizontals, and/or trunnions, the components may be connected by inserting the post into the cavity and swaging or crimping the outside or lip of the cavity over or around the post.

In some embodiments, the central retaining member assembly 340 is relatively short relative to the inner insulators 326. Where the central retaining member assembly 340 is composed of a conductive material such as metal, this configuration minimizes the length of a conductive material in contact with the middle conductor and maximizes the distance from the poles to the conductive central retaining member assembly 340, thereby affording more clearance from the two poles and from the two other conductors than a configuration having a long metal portion at the midpoint. For example, the depicted embodiment has a central retaining member assembly 340 having a length of approximately 10% of the total distance between the two poles, or approximately 20% of the length of each inner insulator 326. Other embodiments may have a central retaining member assembly 340 with a different length shorter than the length of each inner insulator 326.

Figure 4:
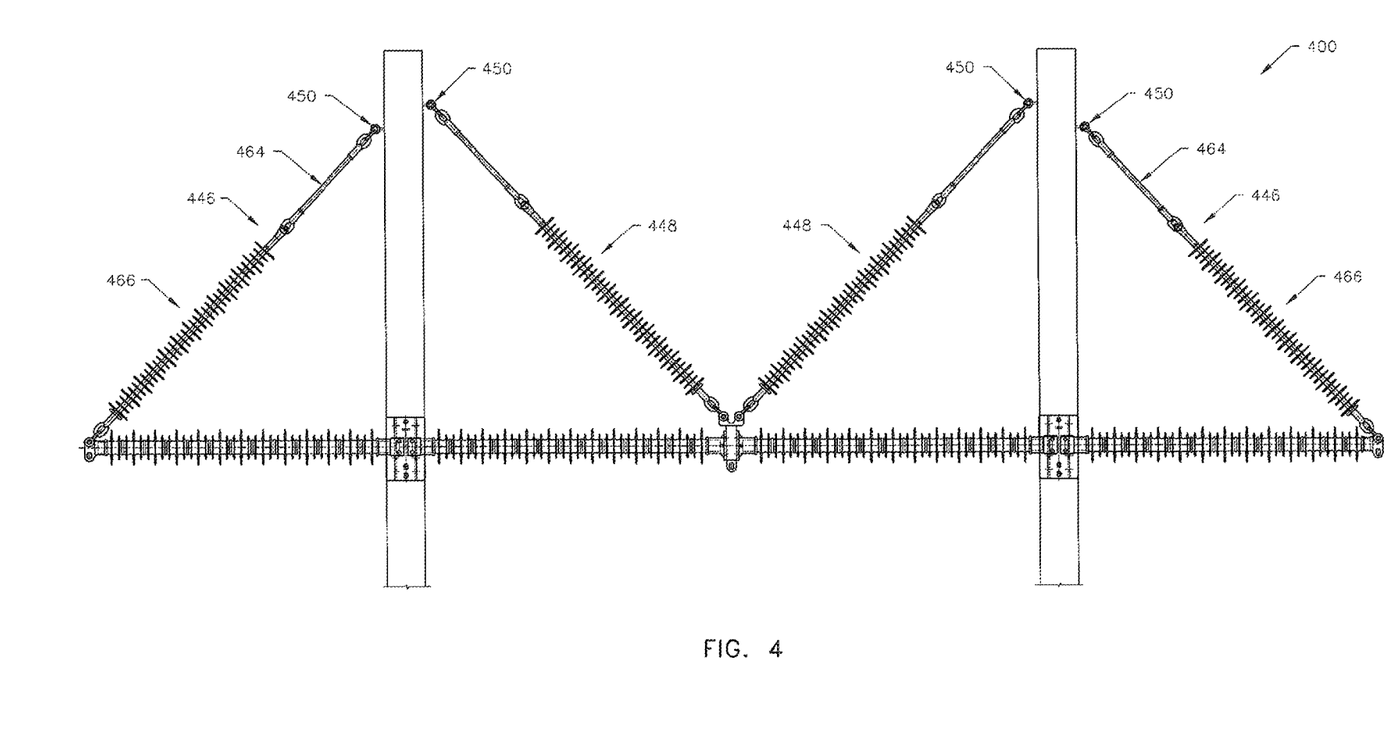
FIG. 4 is a front view of a braced straight horizontal insulated framing according to a fourth example embodiment.

FIG. 4 shows a variant of the linear framing of FIG. 3 as a braced linear framing 400. The overall structure is similar to the embodiment illustrated in FIG. 3, but the framing 400 is braced with additional supporting outer diagonal braces 446 holding up the outer insulators and inner diagonal braces 448 holding up the inner insulators. The braces 446, 448 are attached at a lower end to the insulators or to a central fitting between the inner insulators, and at an upper end to a pole brace mounting 450 attached to a point on the pole or other support structure. The braces 446, 448 provide additional structural support to the framing 400. Each bracing 446, 448 in the illustrated embodiment comprises an elongate insulator 466. In some embodiments, each brace 446, 448 may also have an additional connecting portion 464.

Figure 5:
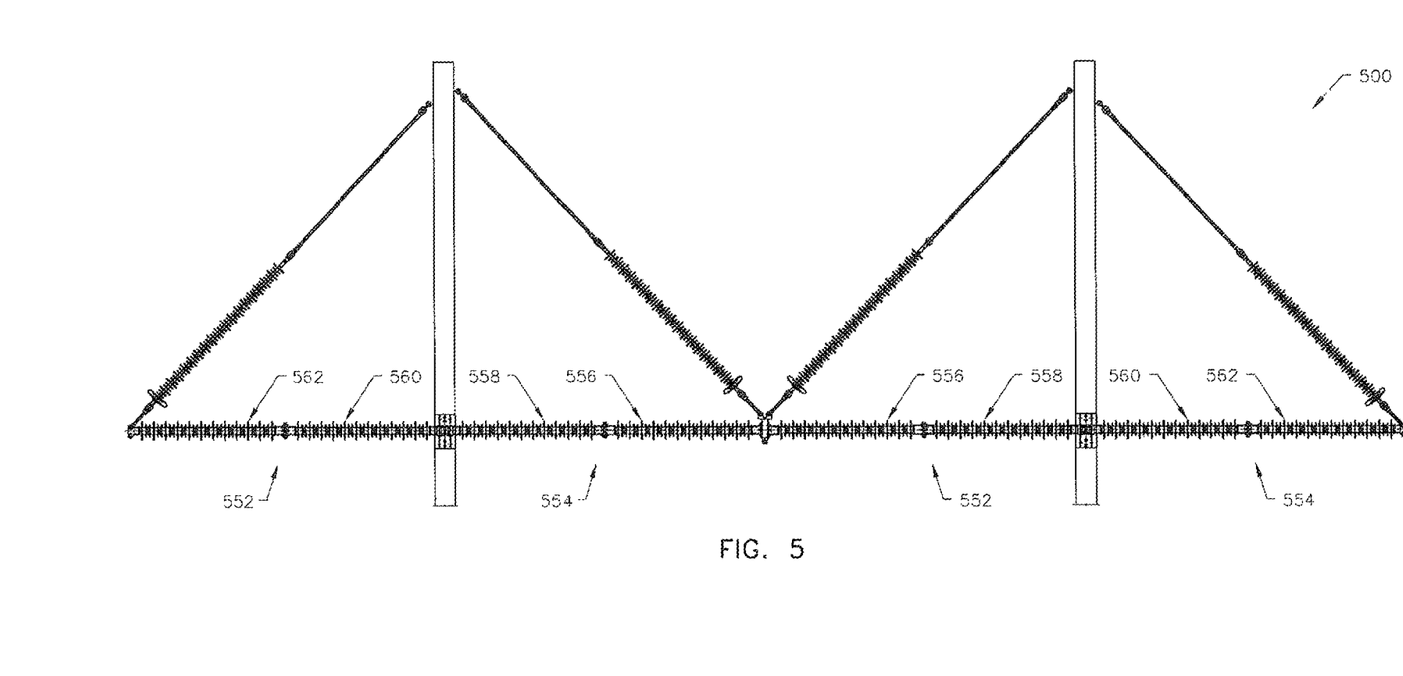
FIG. 5 is a front view of a braced straight horizontal insulated framing having multi-part inner and outer insulators according to a fifth example embodiment.

FIG. 5 shows a variant of the braced linear framing of FIG. 4, where the framing 500 has multi-part inner insulators and outer insulators. The inner insulators comprise a first inner insulator 556 and a second inner insulator 558 joined by an inner insulator connector 552. Similarly, the outer insulators each comprise a first outer insulator 560 and a second outer insulator 562 joined by an outer insulator connector 554. Other embodiments may use insulators sections comprising three or more individual insulators joined together end to end.

Figure 6:
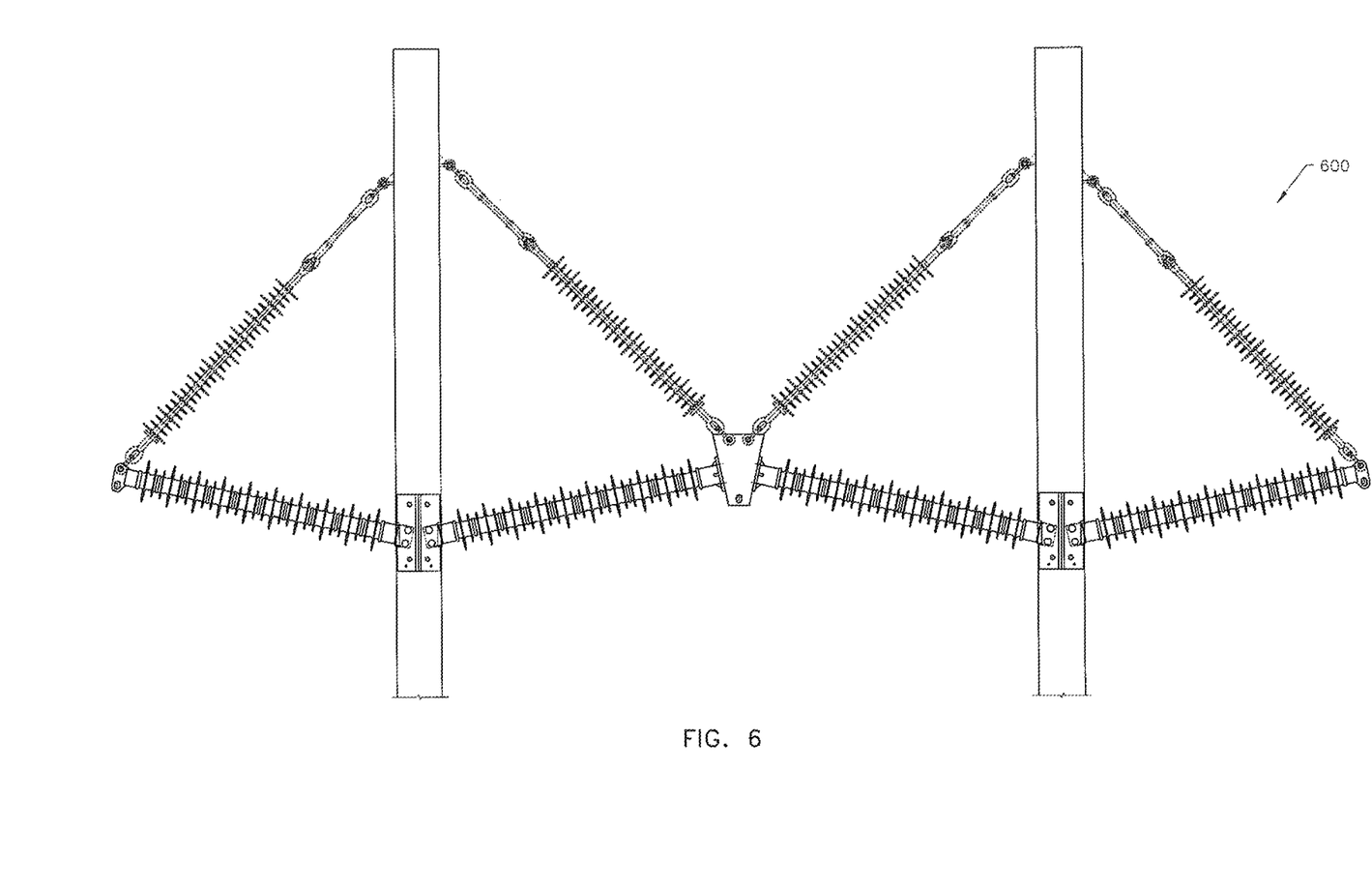
FIG. 6 is a front view of a braced horizontal insulated framing having multi-part inner and outer insulators at slight diagonals according to a sixth example embodiment.

FIG. 6 shows a further variant of the braced linear framing of FIG. 4, the framing 600 having multi-part inner insulators and outer insulators, wherein the inner insulators are canted slightly upward at their inner ends and the outer insulators are canted slightly upward at their outer ends.

Figure 7:
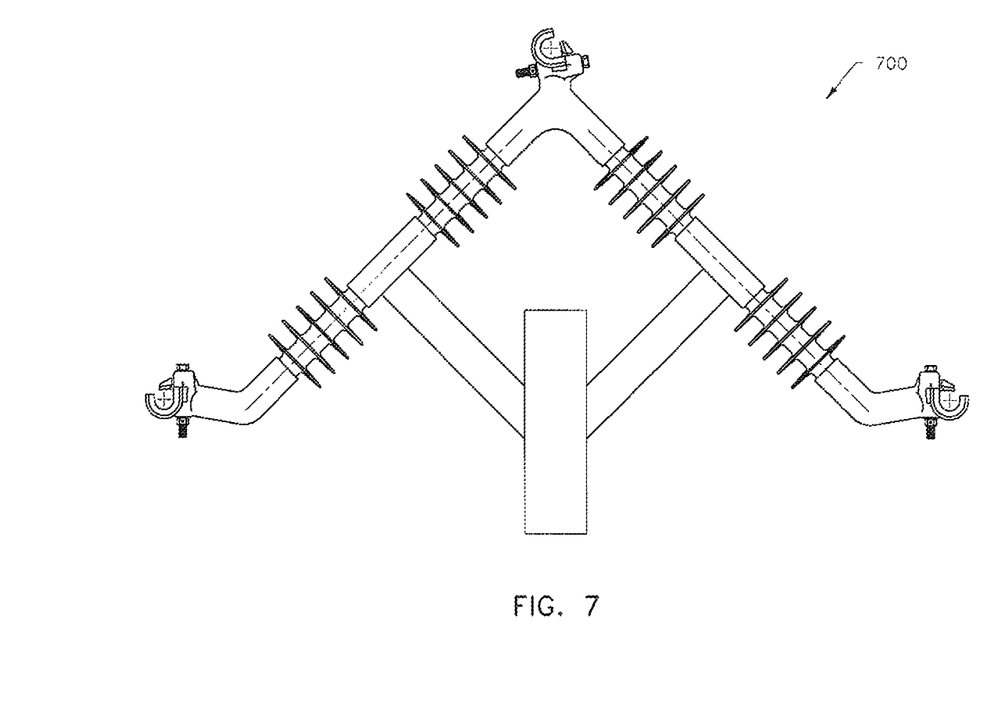
FIG. 7 is a front view of a triangular insulated framing according to a seventh example embodiment.

FIG. 7 shows variant of the triangular framing, the framing 700 having integrally formed K-Clamps™.

Figure 8:
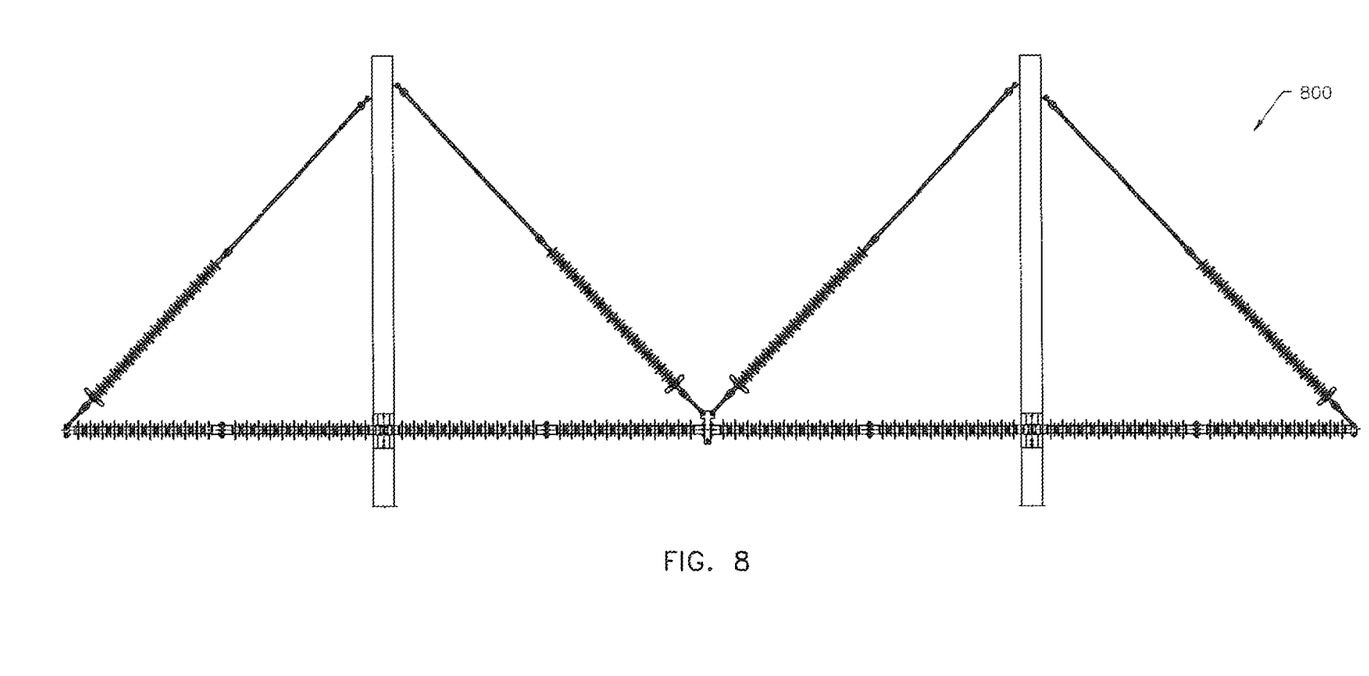
FIG. 8 is a front view of a braced straight horizontal insulated framing having multi-part inner and outer insulators according to an eighth example embodiment.

FIG. 8 shows a further variant of the braced linear framing of FIG. 4, the framing 800 having multi-part inner insulators and outer insulators.

Figure 9:
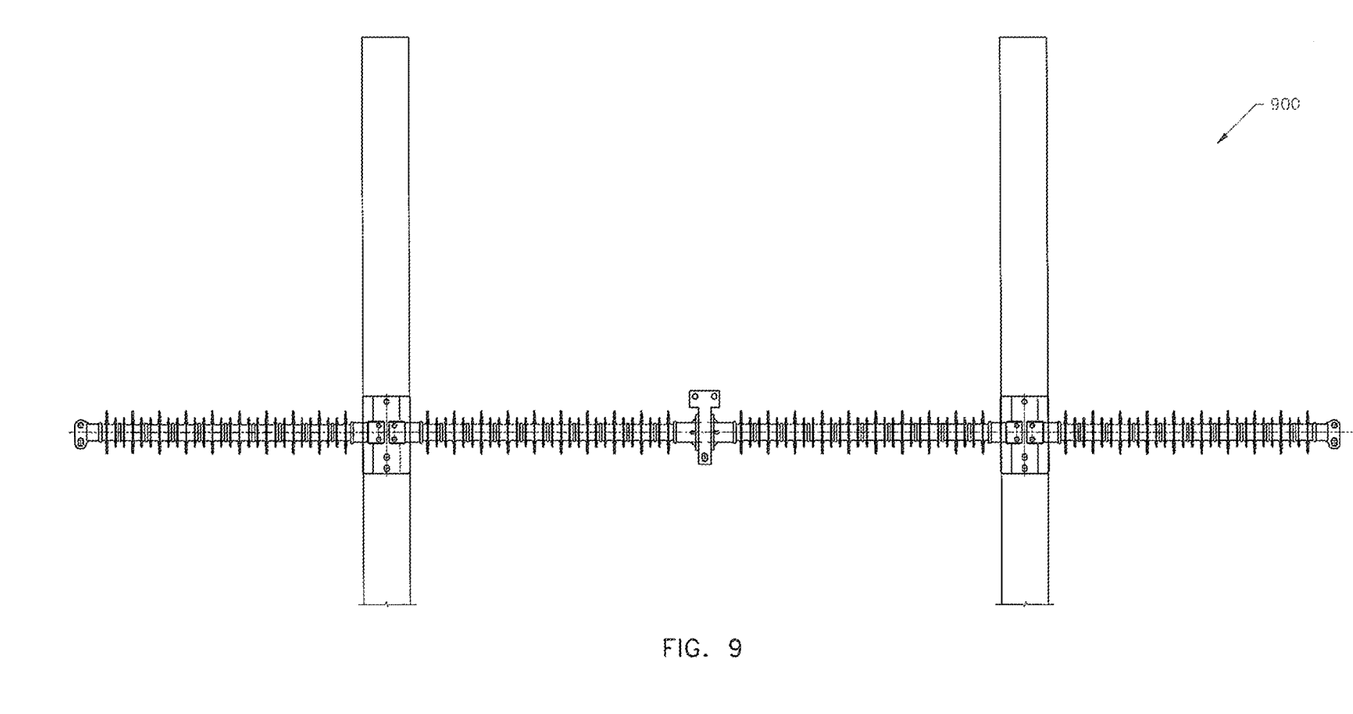
FIG. 9 is a front view of a straight horizontal insulated framing having multi-part inner and outer insulators according to an eighth example embodiment.

FIG. 9 shows a further variant 900 of the straight horizontal framing of FIG. 3.

Figure 10:
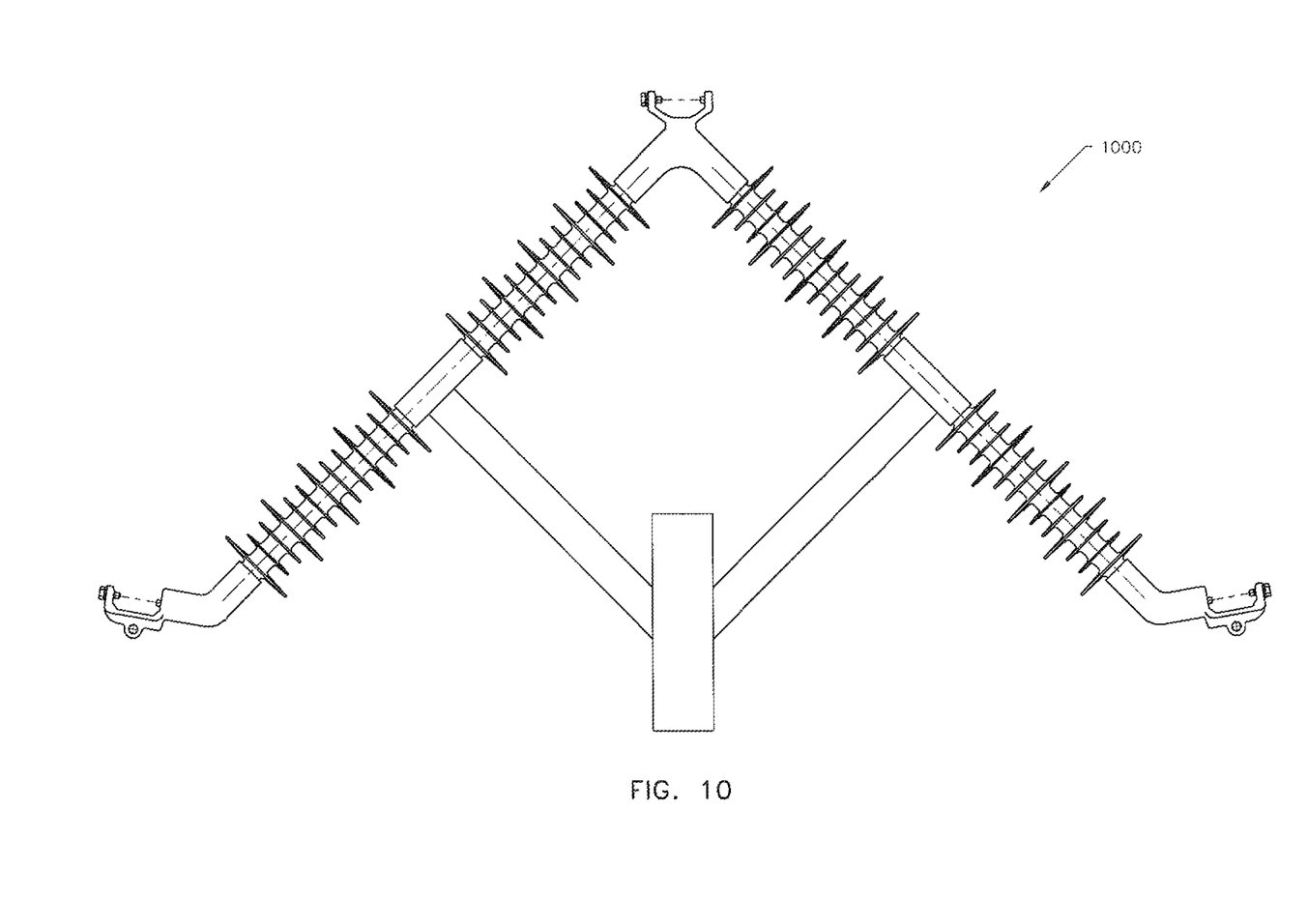
FIG. 10 is a front view of a triangular insulated framing according to a seventh example embodiment.

FIG. 10 shows a further variant of the triangular framing, the framing 1000 having integrally formed trunnions.

The present disclosure may be embodied in other specific forms without departing from the full scope of the claims as read in light of the specification as a whole, and would be understood by a person of skill in the art to encompass various sub-combinations and variants of described features. The described embodiments are to be considered in all respects as being only illustrative and not restrictive. The present disclosure intends to cover and embrace all suitable changes in technology.

What is claimed is:

1. An insulated framing for power lines, comprising:
a top retaining member assembly;
an upper left insulator extending downward and leftward from the top retaining member assembly;
an upper right insulator extending downward and rightward from the top retaining member assembly;
a base member having a left end attached to a bottom end of the upper left insulator and a right end attached to a bottom end of the upper right insulator, the base member adapted to connect to a power line support structure;
a lower left insulator extending leftward from the left end of the base member;
a lower right insulator extending rightward from the right end of the base member;
a left retaining member assembly attached to a left end of the lower left insulator; and
a right retaining member assembly attached to a right end of the lower right insulator.

2. The insulated framing of claim 1, further comprising:
a left mid-leg fitting attached to the left end of the base member; and
a right mid-leg fitting attached to the right end of the base member, wherein the upper insulators and lower insulators attach to the base member by means of the mid-leg fittings.

3. The insulated framing of claim 2, wherein one or more of the upper insulators and lower insulators are detachably connected to one or more of the retaining member assemblies and mid-leg fittings.

4. The insulated framing of claim 3, wherein the detachable connection is by means of a post protruding from an end of the insulator adapted for insertion into a cavity in the retaining member assembly or mid-leg fitting.

5. The insulated framing of claim 1, wherein the lower left insulator and lower right insulator also extend downward.

6. The insulated framing of claim 1, wherein each insulator comprises a rigid elongate core with a non-conductive coating.

7. The insulated framing of claim 1, wherein the base member comprises two arms extending upward and to the sides from the midpoint of the base member.

8. The insulated framing of claim 1, wherein the base member comprises two arms extending substantially straight out to the sides from the midpoint of the base member.

9. The insulated framing of claim 1, wherein the base member further comprises a bracket at the midpoint of the base member adapted for attachment to the power line support structure.

10. The insulated framing of claim 9, wherein the bracket is adapted for attachment to the power line support structure by means of bolt holes positioned to align with conventionally spaced bolt holes used to support existing power line framings.

11. An insulated framing for power lines, comprising:
a top retaining member assembly configured to retain a power line;
an upper left insulator extending leftward from the top retaining member assembly;
an upper right insulator extending rightward from the top retaining member assembly;
a base member having a left end attached to a bottom end of the upper left insulator and a right end attached to a bottom end of the upper right insulator, the base member adapted to connect at its midpoint to a power line support structure;
a lower left insulator extending downward and leftward from the left end of the base member;
a lower right insulator extending downward and rightward from the right end of the base member;
a left retaining member assembly configured to retain a power line attached to a bottom end of the lower left insulator; and
a right retaining member assembly configured to retain a power line attached to a bottom end of the lower right insulator.

12. The insulated framing of claim 11, further comprising:
a left mid-leg fitting attached to the left end of the base member; and
a right mid-leg fitting attached to the right end of the base member, wherein the upper insulators and lower insulators attach to the base member by means of the mid-leg fittings.

13. The insulated framing of claim 12, wherein one or more of the upper insulators and lower insulators are detachably connected to one or more of the retaining member assemblies and mid-leg fittings.

14. The insulated framing of claim 13, wherein the detachable connection is by means of a post protruding from an end of the insulator adapted for insertion into a cavity in the retaining member assembly or mid-leg fitting.

15. The insulated framing of claim 11, wherein the lower left insulator and lower right insulator also extend leftward and rightward respectively.

16. The insulated framing of claim 11, wherein each insulator comprises a rigid elongate core with a non-conductive coating.

17. The insulated framing of claim 11, wherein the base member comprises two arms extending upward and to the sides from the midpoint of the base member.

18. An insulated framing for power lines, comprising:
a central retaining member assembly configured to retain a power line;
an inner left insulator extending leftward from the central retaining member assembly;
a left mounting assembly attached to a left end of the inner left insulator, the left mounting assembly adapted to connect to a power line support structure;
an outer left insulator extending leftward from the left mounting assembly;
a left retaining member assembly configured to retain a power line attached to a left end of the outer left insulator;
an inner right insulator extending rightward from the central retaining member assembly;
a right mounting assembly attached to a right end of the inner right insulator, the right mounting assembly adapted to connect to a power line support structure;
an outer right insulator extending rightward from the right mounting assembly; and
a right retaining member assembly configured to retain a power line attached to a right end of the lower right insulator, wherein the width of the central retaining member assembly is shorter than the width of each of the inner insulators.

19. The insulated framing of claim 18, wherein one or more of the inner insulators and outer insulators are detachably or not detachably connected to one or more of the retaining member assemblies and mounting assemblies.

20. A kit comprising a plurality of insulators and a plurality of retaining member assemblies for use in constructing the insulated power line framings of claim 3.

* * * * *